United States Patent [19]

Hilbig

[11] Patent Number: 4,808,290

[45] Date of Patent: Feb. 28, 1989

[54] ELECTROLYTIC POOL CHLORINATOR HAVING BAFFLED CATHODE CHAMBER INTO WHICH CHLORINATED WATER IS DELIVERED

[76] Inventor: Herbert H. Hilbig, 3125 W. Paradise Dr., Phoenix, Ariz. 85029

[21] Appl. No.: 191,394

[22] Filed: May 9, 1988

[51] Int. Cl.$^4$ .................... C25B 15/02; C25B 15/08; C25B 9/00; C25B 1/26

[52] U.S. Cl. .................. 204/229; 204/238; 204/263; 204/266; 204/128

[58] Field of Search .............. 204/229, 263–266, 204/256, 258, 271, 238, 128, 95

[56] References Cited

U.S. PATENT DOCUMENTS

| | | | |
|---|---|---|---|
| 914,856 | 3/1909 | Meyer | 204/260 |
| 3,223,242 | 12/1965 | Murray | 210/139 |
| 3,563,879 | 2/1971 | Richards et al. | 204/272 |
| 3,570,310 | 3/1971 | Densmore | 73/204 |
| 4,040,919 | 8/1977 | Eng | 204/98 |
| 4,129,493 | 12/1978 | Tighe et al. | 204/228 |
| 4,136,005 | 1/1979 | Persson et al. | 204/266 |
| 4,229,272 | 10/1980 | Yates | 204/128 |
| 4,290,873 | 9/1981 | Weaver | 204/228 |
| 4,308,123 | 12/1981 | Lynn | 204/266 |
| 4,439,295 | 3/1984 | Richards | 204/260 |
| 4,472,256 | 9/1984 | Hilbig | 204/266 |
| 4,500,404 | 2/1985 | Tucker | 204/266 |
| 4,599,159 | 7/1986 | Hilbig | 204/266 |
| 4,613,415 | 9/1986 | Wreath et al. | 204/128 X |
| 4,693,806 | 9/1987 | Tucker | 204/266 X |
| 4,724,059 | 2/1988 | Collier | 204/266 X |
| 4,744,877 | 5/1988 | Maddock | 204/266 |
| 4,767,511 | 8/1988 | Aragon | 204/266 X |

Primary Examiner—Donald R. Valentine
Attorney, Agent, or Firm—Cahill, Sutton & Thomas

[57] ABSTRACT

An electrolytic pool chlorinator produces chlorinated pool water that is added to the cathode chamber to continuously dilute the caustic concentration of the catholyte before being returned to the pool. The cathode chamber includes a series of baffle plates between the primary cathode and the chlorinated pool water entry port in order to maintain the hydroxyl ion concentration near the primary cathode high enough to provide good current efficiency, yet low enough to avoid significant back-migration of hydroxyl ions. The baffle plates also cause metal hardness ions such as calcium to precipitate before reaching the primary cathode. A negatively-charged second cathode spaced apart from the primary cathode also helps to prevent precipitation of metal hardness ions upon the primary cathode. The chlorinator is provided with a feeder tank including a float-controlled valve having a leveraged flexible elongated seal that cooperates with a flared channel to regulate the flow of chlorinated pool water to the suction side of the pool pump. A catholyte access pipe extends from the upper portion of the chlorinator to the cathode chamber in the lowermost portion of the chlorinator to allow a user to flush water, acid, or brine therethrough. A thermostatic switch detects the stoppage of pool water flowing into the chlorinator and disconnects electrical power from both the chlorinator and the pool pump in response thereto.

20 Claims, 5 Drawing Sheets

ELECTROLYTIC POOL CHLORINATOR HAVING BAFFLED CATHODE CHAMBER INTO WHICH CHLORINATED WATER IS DELIVERED

BACKGROUND OF THE INVENTION

1. Field of the Invention

The present invention relates generally to electrolytic pool chlorinators for chlorinating a pool of water, and more particularly, to an electrolytic pool chlorinator having a baffled cathode chamber into which chlorinated pool water is delivered for preventing caustic concentrations within the catholyte from becoming excessively high while maintaining good current efficiency and rapid start-up.

2. Description of the Prior Art

Electrolytic pool chlorinators are well known in the art and are exemplified by the apparatus described in U.S. Pat. Nos. 914,856, issued to Meyer; 3,223,242, issued to Murray; 4,229,272, issued to Yates; 4,129,493, issued to Tighe, et al.; 4,136,005, issued to Persson, et al.; 4,290,873, issued to Weaver; 4,500,404, issued to Tucker; 3,563,879, issued to Richards, et al.; as well as U.S. Pat Nos. 4,472,256 and 4,599,159 issued to the present applicant. Such electrolytic pool chlorinators generally operate by electrolyzing a sodium chloride brine solution contained within an anode chamber, attracting positively-charged sodium ions to a negatively-charged cathode, and attracting negatively-charged chloride ions to the positively-charged anode, thereby liberating chlorine gas at the anode. The chlorine gas released thereby may then be used to chlorinate the water within a swimming pool, spa or the like.

The anode and cathode chambers of such an electrolytic pool chlorinator are typically separated from one another by an ion-permeable barrier to prevent the chlorine gas liberated within the anode chamber from mixing with the hydrogen gas liberated in the cathode chamber and to physically separate the sodium chloride (or brine) anolyte solution within the anode chamber from the sodium hydroxide (caustic soda) catholyte solution within the cathode chamber. The ion-permeable membrane is permeable to positive ions, such as sodium ions formed within the anode chamber, but presents a barrier to the passage of negative ions, such as hydroxyl ions, present within the cathode chamber, at least at relatively low concentrations of such hydroxyl ions.

Ion selective membranes used to separate the anode and cathode cells, such as "NAFION" brand perfluorosulfonic acid membrane commercially available from E. I. DuPont de Nemours and Company of Wilmington, Del., form imperfect ion barriers. Hydroxyl ions within the catholyte can migrate through such ion selective membranes into the anolyte both during periods when the chlorinator is operating, as well as during periods when the chlorinator is shut off. As the concentration of hydroxyl ions within the catholyte becomes greater, back-migration of hydroxyl ions through the ion permeable selective membrane increases. If the sodium hydroxide concentration with the catholyte accumulates to within the range of 15% to 20%, the back-migration of hydroxyl ions into the anolyte is approximately 10% of the total number of hydroxyl ions within the catholyte during chlorinator operation. By comparison, dropping the sodium hydroxide concentration of the catholyte to the range of 1%-3% decreases the rate of back-migration of hydroxyl ions to approximately 2%. While the rate of back-migration of hydroxyl ions is lessened when the chlorinator is shut off, migration of hydroxyl ions into the anolyte during shut off is still significant, particularly since an electrolytic pool chlorinator used with a typical backyard swimming pool is shut off for greater periods of time each day then it is turned on.

Back-migration of hydroxyl ions into the anolyte is undesirable for several reasons. Hydroxyl ions passing into the anolyte initially form hypochlorites and, in a subsequent step, form chlorates, such as sodium chlorate ($NaClO_3$) in the anolyte. Such chlorates accumulate over time within the brine solution, and, at very high concentrations, form a chlorate-saturated brine solution which reduces the amount of sodium chloride that can be dissolved within the anolyte, thereby minimizing further chlorine production. Furthermore, passage of hydroxyl ions into the anolyte reduces chlorine gas production because chlorine which combines with hydroxyl ions to form hypochlorites is prevented from being liberated as chlorine gas. In addition, the presence of hydroxyl ions within the anolyte can lead to passivation of the dimensionally stable anode material resulting from increased oxidation which occurs at high pH within the anolyte. Hydroxyl ions within the anolyte also contribute to the formation of calcium deposits upon the anode side of the ion-permeable membrane, which deposits lead to the plugging of the membrane and a corresponding reduction in the efficiency of the chlorinator.

In U.S. Pat. No. 4,040,919 issued to Eng, it is proposed that hydrochloric acid be periodically added to the anolyte for eliminating chlorates and dissolving calcium deposits upon the ion permeable membrane. However, the addition of hydrochloric acid to the chlorates within the anolyte instantly produces large quantities of poisonous chlorine gas, and is therefore a dangerous procedure to perform. The typical owner of a backyard swimming pool could not be expected to add acid to the anolyte in the manner taught by Eng without posing a substantial safety risk.

Within applicant's U.S. Pat. No. 4,599,159, an electrolytic pool chlorinator is disclosed wherein pool water is continuously delivered to the cathode chamber at a point relatively remote from the cathode to continuously dilute the catholyte. An overflow conduit communicating with the cathode chamber continuously drains catholyte from the cathode chamber to prevent excess concentrations of sodium hydroxide from accumulating therein. While maintaining a relatively low sodium hydroxide concentration within the cathode chamber minimizes undesired back-migration of hydroxyl ions into the anolyte, the reduced hydroxyl ion concentration in the catholyte causes the chlorinator to take longer to start up after it has been shut off for a period of time, since there are relatively few ions in the vicinity of the cathode upon initial start-up which can conduct an electrical current. In contrast, a higher concentration of hydroxyl ions in the catholyte increases the electrical conductivity thereof and results in more efficient short term chlorine production. Moreover, if the concentration of sodium hydroxide within the catholyte is very low, then any metal hardness ions (such as calcium or magnesium) introduced into the cathode chamber (as by the addition of pool water thereto) are more likely to reach the cathode and/or ion permeable membrane before such metal hardness ions precipitate out as a deposit. Such precipitates include calcium carbonate ($CaCO_3$), calcium hydroxide ($Ca(OH)_2$), and magnesium hydroxide ($Mg(OH)_2$), and are more likely to form deposits at the higher pH conditions proximate the cathode. Such deposits upon the cathode and/or membrane reduce the efficiency of the chlorinator and require more frequent maintenance.

Accordingly, it is an object of the present invention to provide an electrolytic pool chlorinator which minimizes back-migration of hydroxyl ions from the catholyte into the anolyte, while at the same time, maintaining a sufficiently high concentration of hydroxyl ions in the vicinity of the cathode to permit quick start-up following periods when the chlorinator is shut off and permitting good electrical conductivity for efficient chlorine production.

It is another object of the present invention to provide such a chlorinator which prevents excessive concentrations of hydroxyl ions from accumulating within the catholyte while simultaneously minimizing the possibility of metal hardness ions within the catholyte from precipitating out and depositing upon the cathode and/or ion permeable membrane.

It is a further object of the present invention to permit the use of relatively hard pool water to dilute the catholyte while avoiding deposits of metal hardness ion compounds upon the cathode and/or ion permeable membrane, despite the relatively high concentrations of metal hardness ions typically present within such pool water.

It is a still further object of the present invention to provide an electrolytic chlorinator that is relatively free of routine maintenance at frequent intervals.

As mentioned above, the formation of metal hardness deposits upon the cathode are to be avoided in order to maintain good electrical conductivity for the chlorinator. Nonetheless, some metal hardness ions added to the catholyte tend to diffuse toward the vicinity of the cathode. Metal hardness ion deposits, such as calcium hydroxide ($Ca(OH)_2$) and magnesium hydroxide ($Mg(OH)_2$), are particularly a problem when pool water is used to dilute the catholyte, since pool water typically contains from 300 to 2000 parts per million of calcium and magnesium.

It is therefore another object of the present invention to reduce the likelihood that any metal hardness ions reaching the vicinity of the cathode will precipitate out and deposit upon the cathode.

As explained above, were chlorates to form and accumulate within the anode chamber, the efficiency of the chlorinator would be reduced. In addition, metal hardness ions within the anolyte can be precipitated as deposits upon the ion permeable membrane, plugging the membrane and further reducing the efficiency of the chlorinator. While such accumulations of chlorates and metal hardness ions can be eliminated by periodic draining of the brine tank, this would require the operator to perform additional maintenance steps.

It is therefore a further object of the present invention to provide an electrolytic chlorinator which serves to prevent accumulations of chlorates and metal hardness ions within the anolyte without requiring the operator to perform additional maintenance steps beyond merely refilling the brine tank with salt.

When chlorine gas is reacted with pool water to chlorinate the same, both hypochlorous acid and hydrochloric acid are produced. Hypochlorous acid is a desired sanitizing agent which kills bacteria and algae in the pool water. On the other hand, hydrochloric acid merely tends to lower the pH of the pool water. While it may be advantageous to briefly maintain chlorinated pool water at a lowered pH to superchlorinate the water, pool water maintained at a pH below 7.0 can cause swimmer discomfort and can cause corrosion of metal fixtures.

Accordingly, it is another object of the present invention to provide such an electrolytic pool chlorinator wherein hydrochloric acid produced upon reaction of chlorine gas with pool water is at least partially neutralized before being returned to the pool.

While some electrolytic pool chlorinators are installed at the time that the swimming pool is constructed, it is more often the case that such electrolytic pool chlorinators are installed with existing swimming pool equipment. For new swimming pool installations, a gravity feed line can be installed from the outlet of the chlorinator to the skimmer of the pool in order to permit chlorinated water to drain back to the pool under the force of gravity. However, when an electrolytic pool chlorinator is added to existing swimming pool equipment, gravity feed of the chlorinated water output from the chlorinator back to the pool is often not possible without breaking the concrete pool decking surrounding the pool in order to lay such a gravity feed line back to the pool. In such cases, it is possible to return the chlorinated water to the swimming pool by coupling the outlet of the chlorinator to the suction side of the pool pump. However, one disadvantage of this technique is that the pool pump can lose its prime if, for some reason, the flow of chlorinated water produced by the electrolytic pool chlorinator is either interrupted while the pool pump is operating or is of a lesser flow rate than the rate at which such chlorinated water is being suctioned back to the pump. If air permitted to enter the pool pump instead of chlorinated water, the pump may lose its prime.

Accordingly, it is an object of the present invention to provide an electrolytic pool chlorinator having a chlorinated water outlet that can be coupled to the suction inlet of the pool pump for returning chlorinated water to the pool without permitting the pool pump to lose its prime.

In designing an electrolytic pool chlorinator, it is desirable to locate the cathode chamber at a lowermost point within the chlorinator housing so that the upper portion of the chlorinator can be utilized to store salt and water to form the brine solution supplied to the anode chamber. The larger the space available to fill the brine tank of the chlorinator with water and salt, the less often that the user needs to add salt or water thereto. On the other hand, after long periods of operation, the cathode chamber may need to be rejuvenated, as by addition acid to remove any deposits which may have formed over extended periods within the cathode chamber. In known electrolytic pool chlorinators, such servicing of the cathode chamber is difficult and typically requires that the chlorinator be disassembled in order to gain access to the cathode chamber. Such disassembly typically requires that the brine tank first be drained, thereby wasting the contents thereof. In addition, during colder winter month, it is desirable to fill the cathode chamber with brine in order to lower the freezing point of the catholyte. In known electrolytic pool chlorinators, there is no simple way to add either acid or a brine solution to the cathode chamber for the purposes described above.

Accordingly, it another object of the present invention to provide an electrolytic pool chlorinator including a cathode chamber formed adjacent the lowermost region of the chlorinator housing to maximize the space available to store salt for forming brine, while simultaneously providing easy access to the interior of the cathode chamber for periodic removal of hardness deposits therein and for adding brine to winterize the unit.

Applicant's prior U.S. Pat. No. 4,599,159 discloses a safety feature for switching off the electrical power supply of the electrolytic pool chlorinator upon detecting a stoppage in the flow of pool water that is normally fed to the chlorinator for intermixing with the chlorine gas produced thereby. Upon detecting a stoppage in the flow of pool water, the electrical power supply of the chlorinator is switched off to prevent any further generation of chlorine gas until pool water is again supplied to the chlorinator. However, the thermostatic switch disclosed in applicant's prior U.S. Pat. No. 4,599,159 serves only to switch off the supply of electrical power to the chlorinator; the supply of electrical power provided to the pool pump motor is totally independent from such thermostatic switch, and accordingly, the pool pump motor continues to be supplied with electrical power even though the chlorinator has been turned off by the thermostatic switch, and even though the pool pump has stopped circulating pool water. However, continued application of electrical power to the pool pump motor for an extended time after the pump has either failed or lost its prime can result in damage to the pump.

Accordingly, it is a further object of the present invention to provide an electrolytic pool chlorinator adapted to help prevent damage to the pool pump upon detecting a stoppage in the flow of pool water ordinarily supplied to the chlorinator.

These and other objects of the present invention will become more apparent to those skilled in the art as the description thereof proceeds.

SUMMARY OF THE INVENTION

Briefly described and in accordance with one embodiment thereof, the present invention relates to an electrolytic pool chlorinator having anode and cathode chambers divided by an ion permeable selective membrane, the chlorinator further including a cathode located proximate to the ion permeable membrane and a baffle disposed in the cathode chamber between the cathode and a region of the cathode chamber remote from the cathode. A mechanism for diluting the catholyte is connected with the cathode chamber, preferably remote from the cathode, for adding water having a relatively low hydroxyl ion concentration to the catholyte and for draining catholyte from the cathode chamber to continuously remove hydroxyl ions from the catholyte. The baffle regulates the diffusion rate of hydroxyl ions from the region of the catholyte surrounding the cathode toward the catholyte dilution mechanism. The baffle maintains a sufficiently high concentration of hydroxyl ions proximate the cathode to permit good current conductivity when the chlorinator is operated, yet prevents the hydroxyl ion concentration within the catholyte in the region of the cathode from becoming high enough to cause significant amounts of back-migration of hydroxyl ions through the ion-permeable membrane and into the anolyte.

In one embodiment of the present invention, the aforementioned baffle may be of the form of a second or auxiliary cathode spaced apart from the primary cathode to divide the primary cathode from remote portions of the cathode chamber with which the catholyte dilution mechanism is interconnected. The auxiliary cathode has openings formed therein and may be sized somewhat smaller than the cross-sectional dimensions of the cathode chamber to permit hydroxyl ions to slowly diffuse from the region surrounding the primary cathode toward the catholyte dilution mechanism. The auxiliary cathode may be negatively-charged, like the primary cathode, for allowing the front and rear faces of the auxiliary cathode to attract any positively-charged metal hardness ions which reach the vicinity of the primary cathode; consequently, only one-third as many metal hardness ions can become deposited upon the primary cathode.

Within another embodiment of the present invention, the aforementioned baffle takes the form of an upper baffle disposed within the cathode chamber and extending substantially laterally thereacross, the upper baffle extending downwardly into the catholyte to a first predetermined depth. A lower baffle is also disposed within the cathode chamber and extends substantially laterally thereacross, generally parallel to but spaced somewhat apart from the upper baffle. The lower baffle extends upwardly from the floor of the cathode chamber into the catholyte to a height substantially near the aforementioned first predetermined depth in order to control the rate at which hydroxyl ions within the catholyte migrate from the region surrounding the cathode toward the catholyte dilution mechanism. An additional baffle may also be provided in order to help prevent any metal hardness ions from the region of the cathode chamber near the cathode or ion permeable membrane. The additional baffle extends substantially parallel to and spaced apart from the lower baffle and extends upwardly beyond the level of the catholyte and downwardly to a point just above the floor of the cathode chamber. Any metal hardness ions diffusing upwardly between the additional baffle and the lower baffle toward the cathode encounter hydroxyl ions diffusing downwardly toward the dilution mechanism downwardly toward the cathode chamber floor precipitate out before passing over the edge of the lower baffle.

The catholyte dilution mechanism includes a source of pool water tending to raise the fluid level of the catholyte within the cathode chamber. An outflow pipe drains off excess catholyte extending above a predetermined catholyte fluid level, the outlet pipe preferably having an inlet end positioned near the floor of the cathode chamber for drawing in any precipitated compounds falling toward the cathode chamber floor. The source of the pool water admitted into the cathode chamber includes a metering cup for metering a substantially constant inflow of pool water to the catholyte despite variations in the rate at which pool water is supplied to the metering cup; pool water supplied by the metering cup dilutes the catholyte at a substantially uniform rate, and thereby maintains the hydroxyl ion concentration of the catholyte in the vicinity of the cathode at a substantially constant value.

Another aspect of the present invention relates to the use of chlorinated pool water, containing hypochlorous acid and hydrochloric acid, as the diluent for the catholyte. The electrolytic pool chlorinator includes a device for reacting the chlorine gas with pool water to form hypochlorous acid and hydrochloric acid which is then introduced into the cathode chamber by the catholyte dilution mechanism; the chlorinated pool water dilutes the catholyte and simultaneously lowers the hydroxyl ion concentration thereof through the reaction of hydrochloric acid with sodium hydroxide to form ionized sodium chloride and water. Excess catholyte drained from the cathode chamber by the catholyte dilution mechanism is returned to the pool of water, including the hypochlorous acid dissolved therein. By reacting the hydrochloric acid formed when the chlorine gas is intermixed with pool water with the sodium hydroxide produced as a byproduct in the cathode chamber during the electrolytic reaction, the chlorinated water returned to the pool by the feeder tank is essentially pH neutral. Moreover, by lessening the hydroxyl ion concentration within the catholyte through the chemical reaction of sodium hydroxide with hydrochloric acid, the pH of the catholyte is retained at a lesser value, further minimizing the likelihood of precipitation of metal hardness ions within the cathode chamber.

Another aspect of the present invention relates to the provision of a chlorinator having a feeder tank including a novel valve structure for permitting chlorinated water within the feeder tank to be returned to the suction side of the pool pump at a controlled rate and without causing the pool pump to lose its prime. The feeder tank includes a base and upwardly extending side walls to form a tank for containing the chlorinated water. The base includes a substantially planar, upwardly facing sealing surface extending between first and second opposing ends and having a flared opening extending therethrough downwardly into the base. The flared opening is relatively narrow and shallow adjacent a first end of the sealing surface and gradually extends wider and deeper toward the second end of the sealing surface, where it terminates in a bore formed through the base. An outlet extends from the base in fluid communication with the bore for being coupled to the suction inlet of the pool pump. A flexible, elastomeric planar seal extends between first and second opposing ends, the first ends of the seal being secured to the second end of the planar sealing surface of the base adjacent the wider and deeper end of the aforementioned flared opening. A float is secured to the second end of the flexible planar seal proximate the narrower and shallower portion of the flared opening. As the feeder tank fills with water, the float lifts the second end of the planar seal off of the first end of the planar sealing surface to expose the narrow, shallow portion of the flared opening. As the water level rises further within the feeder tank, the float gradually peels the flexible seal off the planar sealing surface to expose greater amounts of the flared opening, thereby permitting chlorinated water to be withdrawn from the feeder tank at a faster flow rate. When the level of chlorinated water within the feeder tank falls to a low level, the flexible seal covers the entire length of the flared opening, thereby preventing additional chlorinated water or air from being drawn into the pool pump.

Another feature of the present invention is an electrolytic pool chlorinator which provides convenient access to the cathode chamber for periodic servicing without requiring disassembly of the chlorinator, while maximizing the volume available for the storage of salt within the chlorinator housing in order to form the brine solution. The cathode chamber is disposed proximate to the floor of the outer housing of the chlorinator, and the cathode chamber includes a ceiling dividing the cathode chamber from the salt storage volume of the chlorinator housing and partially supporting salt stored therein. The outer housing of the chlorinator includes a removable upper cover and a cathode access pipe extends generally vertically within the chlorinator from a point just below the removable cover to a lower end which passes through the ceiling of the cathode chamber in fluid communication with the cathode chamber. When servicing the cathode chamber, water may be poured into the upper end of the cathode access pipe to flush the catholyte from the cathode chamber, and acid may then be poured into the cathode access pipe to dissolve and remove any hardness deposits which have formed over time within the cathode chamber. Additional water may be poured into the cathode access pipe to flush the acid from the cathode chamber. As fluids are poured into the cathode access pipe, an equivalent amount of fluid overflows out of the cathode chamber through the above-described outflow pipe. During winter months, a brine solution may be poured into the cathode access pipe to lower the freezing point of the catholyte.

It will be recalled that one of the objects of the present invention is to provide a chlorinator which periodically flushes chlorates, metal hardness ions, and other contaminants from the anolyte without requiring the user to perform maintenance beyond merely refilling the brine tank with salt. Accordingly, the chlorinator of the present invention includes an anode access pipe which has a lower end in fluid communication with the anode chamber and an upper end having an overflow opening at a first predetermined height. The chlorinator includes a mechanism for maintaining the fluid level in the brine tank at a second predetermined height below the first predetermined height at which the aforementioned overflow opening is located. The chlorinator further includes a flow path coupling the overflow opening of the anode access pipe to the cathode chamber. Each time the user refills the brine tank with salt, contaminated anolyte displaced by the additional salt rises within the anode access pipe and overflows through the overflow opening into the cathode chamber; such contaminants are eventually diluted within the cathode chamber and drained to the swimming pool. The reaction column used to intermix chlorine gas with pool water can advantageously serve as the flow path through which the overflowing anolyte is directed to the cathode chamber.

Yet another aspect of the present invention relates to the provision of an electrolytic pool chlorinator which disconnects electrical power from the pool pump motor upon detecting a stoppage in the flow of pool water normally supplied to the chlorinator. The chlorinator includes an inlet coupled to the pool pump for receiving a stream of pool water therefrom. The pool water received by the chlorinator inlet is caused to flow through a metal conduit before being combined with the chlorine gas liberated by the chlorinator. A heat source is positioned in thermal contact with the aforementioned metal conduit, as is a thermostatic switch. The thermostatic switch is closed for connecting alternating current electrical power to the electrical power supply for the chlorinator when the temperature of the aforementioned metal conduit is below a predetermined temperature. When the temperature of the aforementioned metal conduit rises above the predetermined temperature, the thermostatic switch opens, disconnecting alternating current electrical power from the electrical power supply of the chlorinator. The chlorinator power supply includes an output terminal electrically coupled to the side of the thermostatic switch that is also coupled to the electrical power supply of the chlorinator, and a wire is interconnected between the aforementioned output terminal and a power input terminal of the electric motor that powers the pool pump. When pool water stops flowing through the metal conduit for several minutes, the temperature of the metal conduit rises, causing the thermostatic switch to open. The opening of the thermostatic switch simultaneously disconnects electrical power from both the pool chlorinator as well as the pool pump motor, thereby avoiding damage to the pool pump which might result when the pump loses its prime for an extended period of time.

BRIEF DESCRIPTION OF THE DRAWINGS

FIG. 12 is a bottom view of a chlorine gas collection baffle shown in FIG. 11.

DETAILED DESCRIPTION OF THE PREFERRED EMBODIMENTS

Figure 4:
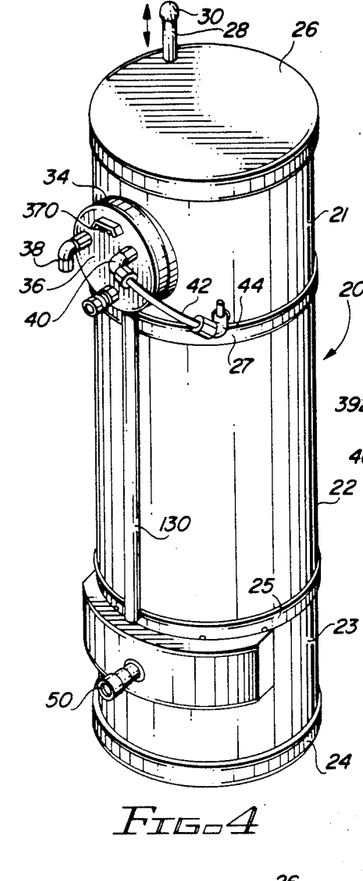
FIG. 4 is a perspective view of the outer housing of an electrolytic pool chlorinator constructed according to the teachings of the present invention.

Referring to FIG. 4, the electrolytic pool chlorinator of the present invention is designated generally by reference numeral 20 and includes a cylindrical outer housing 22, a circular floor 24, and a removable upper cover 26. Extending upwardly through cover 26 is a salt and water level indicator tube 28 having an enlarged knob 30 at the upper end thereof referring briefly to FIG. 13, indicator tube 28 extends downwardly into the interior of chlorinator housing 22 and includes a foot 32 at the lower end thereof for resting upon a quantity of salt deposited within chlorinator 20 in order to form a brine solution. The relatively height of indicator tube 28 thereby indicates the quantity of salt remaining within chlorinator 20.

Figures 11, 13, 14:
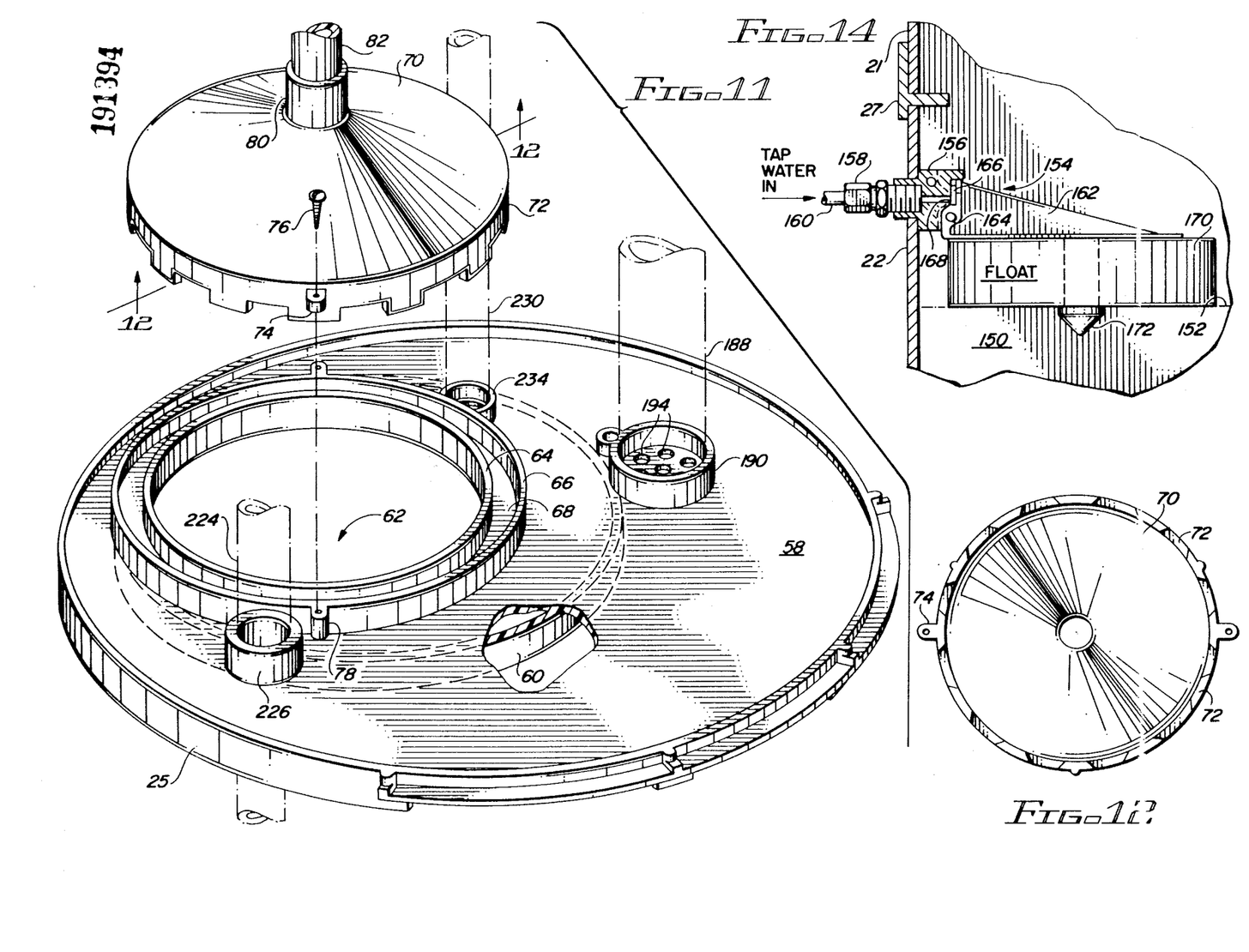
FIG. 11 is a perspective view of a dividing wall disposed within the chlorinator housing for dividing the salt storage volume of the chlorinator housing from the anode and cathode chambers disposed therebelow.
FIG. 13 is a cross-sectional schematic illustration of the interior of the electrolytic pool chlorinator illustrating a network of baffles within the cathode chamber, as well as the catholyte dilution mechanism and feeder tank.
FIG. 14 is a partial cross-sectional view of the brine tank and illustrates a float-controlled valve for adding fresh tap water of the brine tank.
Figure 13:
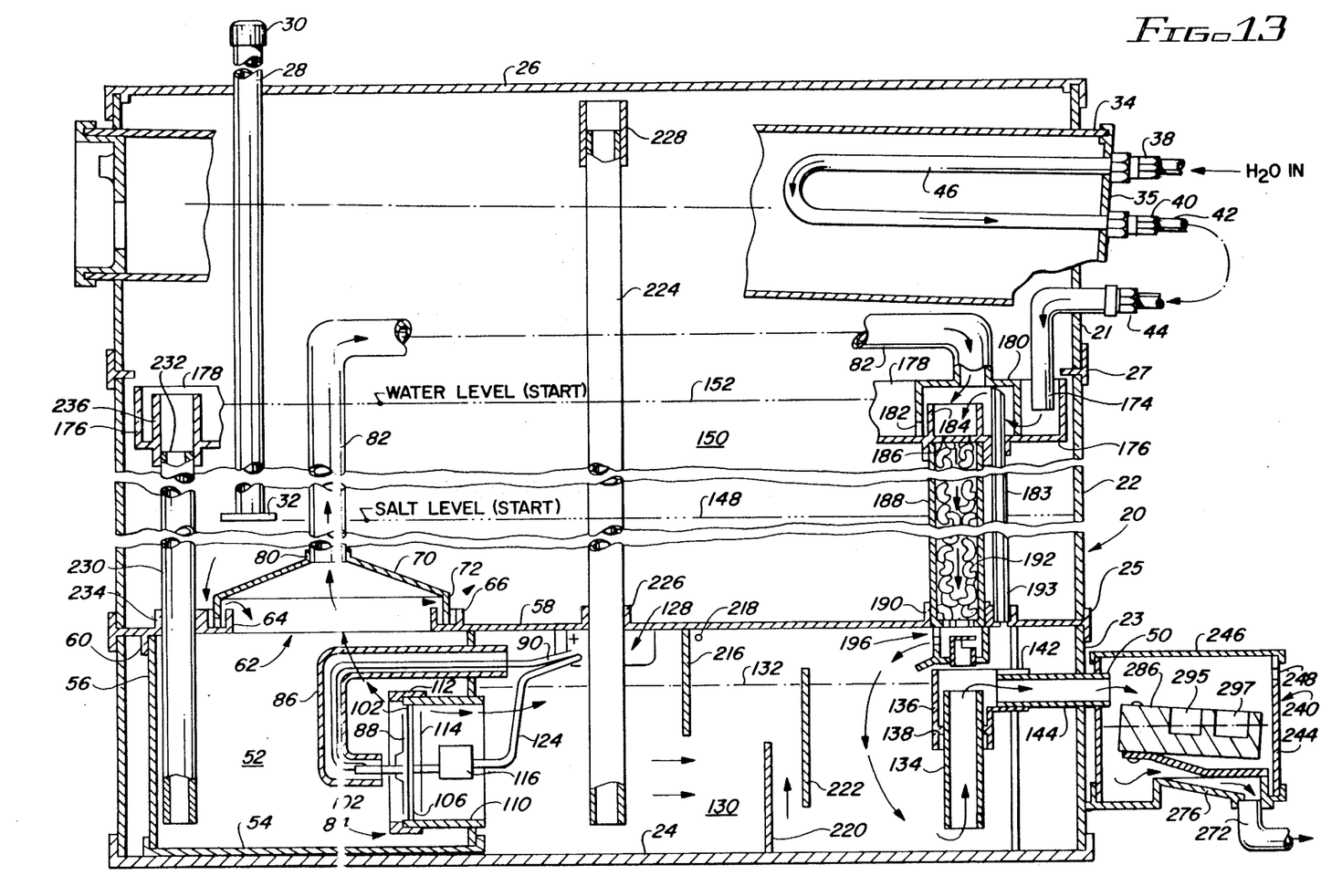

Electrical power supply housing 34 extends substantially horizontally through the upper portion of chlorinator housing 22, as shown in FIGS. 4 and 13. Power supply housing 34 includes a front face place 36 form which extends a pool water inlet connector 38 for coupling to a pressurized source of pool water, in a manner described below with reference to FIGS. 1 and 2. Pool water entering through connector 38 exits from a similar connector 40. Connector 40 is coupled by a tube 42 to a similar connector 44 extending through cylindrical housing 22 into the interior of chlorinator 20.

Figure 6:
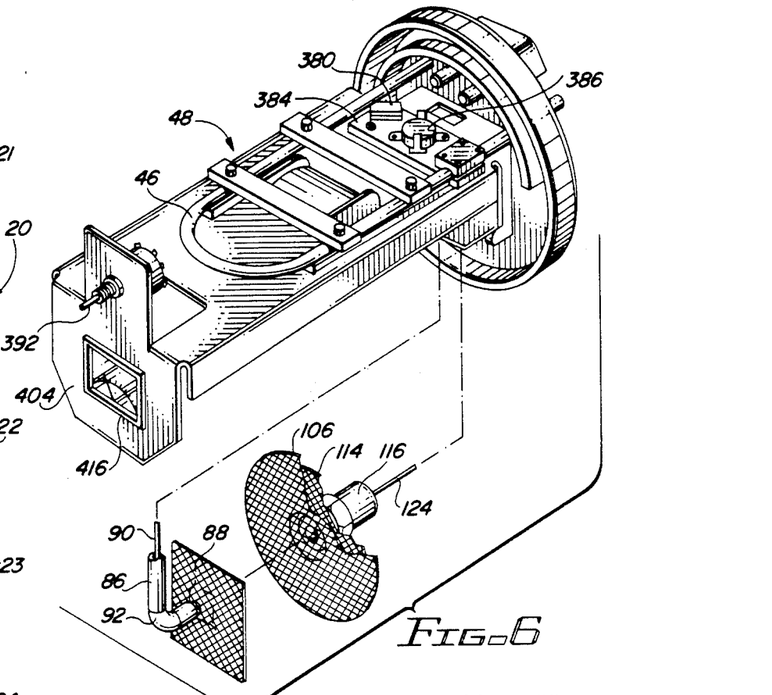
FIG. 6 is a perspective view of the electrical power supply of the chlorinator, including a thermostatic safety switch, and further illustrating the anode and cathode components to which the electrical power supply is electrically connected.

Referring briefly to FIGS. 6 and 13, pool water received by connector 38 is circulated through a U-shaped metal conduit extending within the electrical power supply 48 of the chlorinator before exiting through connector 40. Metal conduit 46 is used in conjunction with a resistive heater and a thermostatic switch, to be described below, in order to stop the production of chlorine gas when the flow of pool water is interrupted and to protect the pool pump motor against damage following a loss of prime of the pool pump. Metal conduit 46 may also serve as a heat sink to remove heat from various power supply components. Also shown in FIG. 4 extending from the lower portion of chlorinator 20 is a chlorinated water outlet port 50 for discharging chlorinated pool water for return to the swimming pool.

The general operation of chlorinator 20 is best understood by reference to FIG. 13. Chlorinator 20 includes an anode chamber designated generally by reference numeral 52. Anode chamber 52 is bounded by a circular anode chamber floor 52, a cylindrical anode chamber side wall 56, and an upper ceiling plate 58. Ceiling plate 58 is shown in greater detail in FIG. 11 and includes a downwardly extending circular flange 60 which extends about the upper rim of cylindrical side wall 56. As shown in FIGS. 11 and 13, ceiling plate 58 has a relatively large opening 62 formed therein which opening is surrounded by a pair of upwardly extending concentric flanges 64 and 66 defining a channel 68 therebetween. An inverted funnel-shaped member 70 serves as a chlorine gas collection baffle and has an outer diameter commensurate with that of channel 68 for permitting the downwardly-turned rim 72 thereof to be inserted into channel 68. As shown in FIG. 11, a mounting ear 74 extends from rim 72 and has a hole formed therein for receiving a mounting screw 76. A similar mounting ear 78 extends from outer rim 66 of ceiling plate 58 and has a hole formed therein for engaging the lower tip of screw 76, thereby maintaining chlorine gas collection baffle 70 in position over hole 62. Gas collection baffle 70 includes an upwardly directed central tower 80 coupled with the lower end of a chlorine gas delivery tube 82. Referring to FIG. 11, the lower edge of downwardly turned flange 72 is of a stepped configuration for permitting saturated brine solution from the brine tank above baffle 70 to pass around the peripheral edges of baffle 70 into anode chamber 52, while preventing solid salt particles from passing into anode chamber 52.

Figure 7:
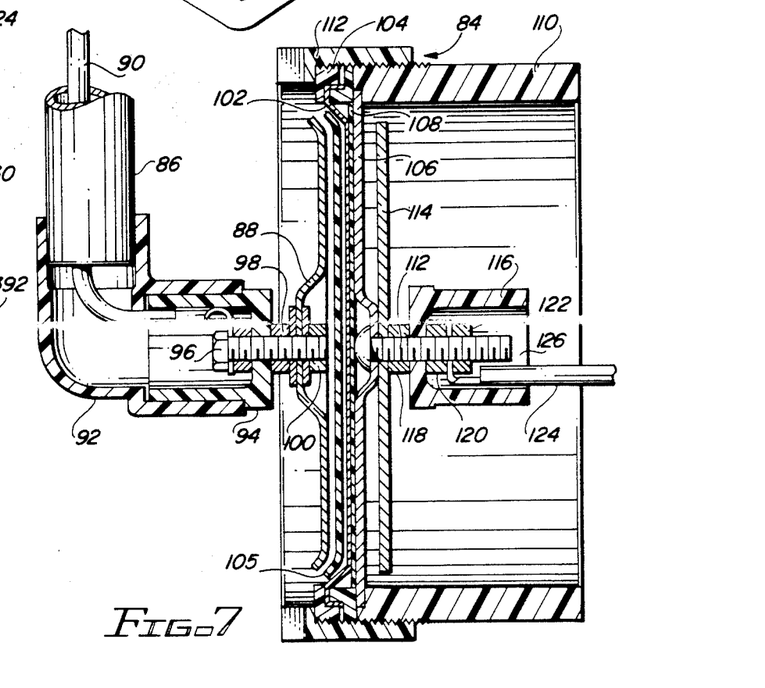
FIG. 7 is a cross-sectional view of the operative portion of the chlorinator, including the anode, ion permeable membrane, primary cathode, and an auxiliary cathode.

Referring to FIG. 7 and FIG. 13, a cylindrical membrane/cathode support housing 84 extends into anode chamber 52 through side wall 56 thereof. Membrane/cathode support housing 84 includes a cylinder 110 having an externally threaded end engaged by a retaining ring 112. Also extending through the upper portion of cylindrical side wall 56 is a polyvinyl chloride (PVC) tube 86 which serves both to support anode 88 and to insulate a lead-in wire 90 extending between electrical power supply 48 and anode 88. As shown in FIG. 13, PVC tube 86 initially extends horizontally into anode chamber 52 and then turns downwardly. Referring to FIG. 7, a PVC elbow connector has one port coupled to the lower end of tube 86 and a second port which has a fitting 94 cemented therein. A bolt 96 extends through fitting 94 in sealing engagement therewith and further extends through anode 88 which is secured thereto by nuts 98 and 100. Bolt 96 is in electrical contact with conductor 90 for imposing a positive electrical voltage upon anode 88. Positioned parallel to and slightly spaced apart from anode 88 is a NAFION brand ion permeable selective membrane 102 supported by an annular ring 104. An apertured circular spacer plate 105 made of VEXAR brand material is positioned between anode 88 and membrane 102 to prevent the membrane from being damaged due to contact with anode 88. A primary cathode plate 106 is positioned parallel to and closely proximate membrane 102 on the side thereof opposite anode 88. An apertured spacer plate 108 also made of VEXAR brand material is interposed between primary cathode 106 and membrane 102 for maintaining primary cathode 106 slightly spaced apart therefrom. Primary cathode 106, spacer 108, and membrane support ring 104 are clamped against the open end of cylinder 110 by internally threaded retaining ring 112 which threadedly engages the externally threaded end of cylinder 110. The preferred materials used to form anode 88, membrane 102, and primary cathode 106 are disclosed in applicant's prior Pat. No. 4,599,159, the disclosure of which is hereby incorporated by reference.

Primary cathode 106 includes a center opening through which the shaft of bolt 112 extends. Bolt 112 also passes through a secondary of auxiliary cathode 114 spaced somewhat apart from primary cathode 106 and having a diameter slightly less than the internal diameter of cylinder 110. The shaft of bolt 112 also extends into a PVC cap 116 spaced apart from auxiliary cathode 114 by a spacing washing 118. Nut 120 locks cap 116, washer 118, auxiliary cathode 114, and primary cathode 106 together as a unit, and nut 122 secures to bolt 112 a conductor from insulated wire 124 for imposing a negative voltage upon both primary cathode 106 and auxiliary cathode 114. The open end 126 of PVC cap 116 is then filled with an epoxy to seal the interior components thereof. Referring to FIG. 13, anode wire 90 and cathode wire 124 are routed through a hydrogen gas vent opening 128 in the side wall of chlorinator housing 22 and are routed upwardly along the exterior of chlorinator housing 22 through a wire guide 130 (see FIG. 4) to the electrical power supply 48.

Still referring to FIG 13, cathode chamber 130 is bounded by the lower floor 24 of chlorinator 20, by lower cylindrical wall 23, by inner cylindrical wall 56 (which divides cathode chamber 130 from anode chamber 52), and by ceiling plate 58 (shown in FIG. 11). Cathode chamber 130 also includes the interior of cylinder 110 extending through cylindrical wall 56 and containing primary cathode 106 and auxiliary cathode 114 (see FIG. 7). A catholyte is normally maintained within cathode chamber 130 and is maintained at the level designated by dashed lines 132. Shown within cathode chamber 130 remote from primary cathode 106 is a vertically-oriented outflow tube 134 having an open lower end disposed slightly above floor 24 of cathode chamber 130. The upper end of outflow tube 134 is also open and terminates at a height corresponding with catholyte fluid level 132. The upper end of outflow tube 134 is surrounded by an oversizing pipe 136 having an interior diameter greater than the outer diameter of outflow tube 134. The lower end of pipe 136 is sealed against the outer surface of outflow tube 134 by an annular ring 138. The upper end 140 of enlarged pipe 136 is opened and extends slightly above the open end of outflow tube 134. Extending laterally from oversized pipe 136 is a port collar 142 defining a horizontal bore therethrough centered at, or slightly below, the upper end of outflow tube 134. A crossflow tube 144 has a first end cemented within port collar 142 and a second end which extends through lower cylindrical wall 23, terminating in chlorinated pool water outlet 50. The addition of any fluid to cathode chamber 130 tends to cause catholyte level 132 to rise, but a corresponding amount of fluid spills over the upper end of outflow tube 134 and out of chlorinator 20 through crossflow tube 144.

As mentioned above, electrolytic pool chlorinators produce chlorine gas by electrolyzing a sodium chloride brine solution within the anode chamber, attracting positively-charged sodium ions towards the negatively-charged cathode while attracting negatively-charged chlorine ions to the positively-charged anode, thereby liberating chlorine gas within the anode chamber. The passage of positively charged sodium ions through the ion permeable membrane into the cathode chamber causes water within the cathode chamber to dissociate into negatively-charged hydroxyl ions and positively-charged hydrogen ions liberated from the cathode as hydrogen gas.

The brine solution supplied to anode chamber 52 is formed by depositing a quantity of salt within chlorinator 20 upon ceiling plate 58 to an initial level designated by dashed line 148. The volume enclosed by cylindrical side walls 22 and 21 and ceiling plate 58 forms a brine tank 150 which continuously supplies a saturated brine solution to anode chamber 52. Water is supplied to brine tank 150 in order to maintain the water level therein at the level designated by reference numeral 152. Referring briefly to FIG. 14, a float operated valve assembly 154 includes a valve body 156 extending through cylindrical side wall 22 and including an external connector 158 coupled to a tap water supply tube 160 which delivers clean tap water from a municipal water supply system. Valve arm 162 is pivotally secured to valve body 156 by pivot axle 164. Valve arm 162 includes a rubber seal 166 designed to contact and seal against the open end of bore 168 extending through valve body 156. Float 170 is secured to valve arm 162 by a downwardly depending pin 172 passing through float 170. If the level of the water within brine tank 150 drops below the level indicated by reference numeral 152, float 170 pivots downwardly and permits fresh tap water to enter brine tank 150 until the level of water within brine tank 150 again reaches level 152. Thus, as salt initially deposited in brine tank 150 is consumed, water is added to brine tank 150 to occupy the volume previously occupied by the consumed salt. While pool water may be used to fill brine tank 150, fresh tap water is preferred since fresh tap contains fewer contaminants which could form chlorates or hardness deposits within anode chamber 52.

Referring to FIGS. 11-13, chlorine gas liberated at anode 88 during the electrolytic process rises upwardly and is collected by collection baffle 70 and routed by delivery tube 82 to a mechanism for reacting the chlorine gas with pool water. As explained above, pool water circulated through power supply housing 34 is delivered by connection tube 42 to an external fitting 44. Connector 44 is coupled to an inverted L-shaped tube 174 which passes through cylindrical side wall 25 and delivers pool water into a cup 176 supported within brine tank 150. Cup 176 has an upper lip 178 which extends to a height above the water level 152 of brine tank 150. Disposed within cup 176 is a smaller inverted cup 180 having a central bore in the ceiling thereof in communication with chlorine gas delivery tube 82. As shown in FIG. 13, the lower edge of inverted cup 180 has openings 182 formed therein whereby pool water deposited within cup 176 passes into the interior of inverted cup 180.

A vertically-oriented cylinder 184 extends upwardly from the floor of cup 176 within inverted cup 180. The open upper end of cylinder 184 terminates prior to reaching either the ceiling of cup 180 or upper lip 178 of cup 176. A plurality of holes, like that designated by reference numeral 186, are formed in the floor of cup 176 within the interior of cylinder 184. Extending downwardly from the floor of cup 176, and centered with cylinder 184, is a cylindrical tube 188, the lower end of which is received by an annular ring 190 (see FIG. 11) formed upon the upper face of ceiling plate 58. Cylinder 188 houses a reaction column filled with ceramic burl saddles 192 which provide a large surface area upon which pool water can absorb and react with chlorine gas passing therethrough. Pool water deposited within cup 176 passes into the interior of inverted cup 180 and spills over the upper lip of cylinder 184 into reaction column 188. Similarly, chlorine gas delivered by delivery tube 182 is drawn into reaction column 188 and intermixes with the pool water falling therethrough to form hydrochloric acid and hypochlorous acid. Vacuum breaker tube 183 extends upwardly from the upper portion of cathode chamber 130 to a point just below the ceiling of inverted cup 180 and maintains atmospheric pressure within the upper portion of inverted cup 180.

Rather than returning the chlorinated pool water formed within reaction column 188 directly to the swimming pool, the chlorinated pool water is first delivered to cathode chamber 130 at a point remote from primary cathode 106. A metering cup of unique design is provided immediately below reaction column 188 to add chlorinated pool water at a relatively uniform rate (preferably, one-half gallon per minute) to the catholyte in order to continuously dilute the catholyte and regulate the hydroxyl ion concentration thereof. As shown most clearly in FIGS. 11 and 13, metering cup 196 includes a cylindrical side wall 198 having an open upper end 200 that is secured to the lower face of ceiling plate 58 concentric with annular ring 190. Metering cup 196 includes a lower floor 202 which closes off the lower end of cylinder 198. A circular opening 204 is formed near the lower end of cylinder 198 for metering a flow of chlorinated pool water which flows into the catholyte for diluting the same. Floor 202 includes down-wardly angled portion 206 adjacent hole 204 for allowing pool water exiting hole 204 to gently drip into the catholyte from a point just above catholyte level 132.

Figure 10:
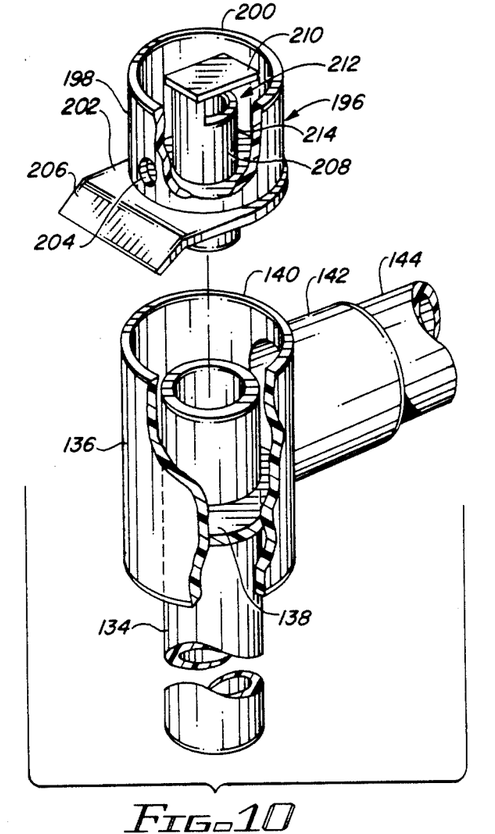
FIG. 10 is a cut-away perspective view of a mechanism used to dilute the catholyte within the cathode chamber of the electrolytic pool chlorinator, including a constant flow pool water inlet, as well as a catholyte outflow tube.

Assuming that reaction column 188 supplies chlorinated pool water to metering cup 196 at a rate faster than that at which water exits through hole 204, then a relief must be provided for the excess flow of chlorinated pool water. In this regard, a smaller diameter tube 208 extends upwardly through a bore in floor 202 of metering cup 196. The lower end of tube 208 is open and is concentric with the upper open end 140 of cylinder 136 of the above-described outflow network. The upper end of tube 208 is covered by diverter plate 210 so that chlorinated pool water dripping into metering cup 196 cannot drip directly into the upper end of tube 208. As shown in FIG. 10, the upper end of tube 208 includes a notched portion 212 having an upper lip 214 elevated above metering hole 204. Any chlorinated pool water which accumulates within metering cup 196 above the level of lip 214 spills over into tube 208 and passes therethrough into the overflow network therebelow. Thus, metering cup 196, in combination with outflow tube 134 and cross flow tube 144, serve to continuously dilute the catholyte within cathode chamber 130 at a relatively continuous rate.

As mentioned above, by allowing the chlorinated pool water produced in reaction column 188 to pass through the catholyte before being returned to the swimming pool, hydrochloric acid formed in reaction column 188 is neutralized by hydroxyl ions within the catholyte in order to render the chlorinated pool water that is returned to the swimming pool relatively pH neutral. Moreover, the addition of chlorinated pool water containing hydrochloric acid rather than pH neutral water, to the catholyte more efficiently lowers the hydroxyl ion concentration within the catholyte.

As mentioned above, one of the objects of the present invention is to provide an electrolytic pool chlorinator which maintains a sufficiently high hydroxyl concentration near the cathode to permit quick start up and good current efficiency while preventing the hydroxyl concentration from increasing to the point where significant amounts of back-migration of hydroxyl ions occurs. While continuous dilution of the catholyte, in the manner explained above, helps prevent excessive hydroxyl ion concentration, dilution alone does not insure a sufficient hydroxyl ion concentration adjacent the cathode to insure good current conductivity. Applicant has determined that a hydroxyl ion concentration adjacent the cathode in the range of 1% to 3% is considered optimal for several reasons. First, by reducing the hydroxyl ion concentration from 15%-20% down to the 1%–3% range, back-migration of hydroxyl ions toward the anode can be reduced by approximately 75%. Secondly, a 1%–3% hydroxyl ion concentration adjacent the cathode still provides relatively good conduction of current between the anode and cathode. Lastly, a concentration of 1%–3% of hydroxyl ions in the vicinity of the cathode is sufficiently high to cause precipitation of any metal hardness ions before such metal hardness ions reach the cathode or the ion permeable membrane. As mentioned above, auxiliary cathode 114 serves in part to restrict the diffusion of hydroxyl ions away from primary cathode 106, and thereby serves to maintain the hydroxyl ion concentration adjacent primary cathode 106 in the desired range despite the much lower hydroxyl ion concentration of the catholyte near metering cup 196 and outflow tube 134. While the flow of catholyte is turbulent adjacent the primary cathode 106 due to formation of hydrogen gas bubbles, auxiliary cathode 114 damps out such turbulence resulting in more viscous flow of the catholyte. In addition, any metal hardness ions, such as calcium, which approach toward primary cathode 106 tend to precipitate upon the front and rear faces of auxiliary cathode 114, thereby reducing by approximately ⅔ the amount of hardness deposits which can form upon primary cathode 106.

To further insure that the hydroxyl ion concentration proximate the primary cathode 106 is maintained in the desired 1%–3% range, a baffle network is preferably provided within cathode chamber 130 to control the rate at which hydroxyl ions generated at the cathode can diffuse toward outflow tube 134. The aforementioned baffle network includes an upper baffle 216 which extends fully across cathode chamber 130 from ceiling plate 58 downwardly into the catholyte below catholyte level 132. Not only does upper baffle 216 serve to control the diffusion of hydroxyl ions, but it also forms a gas trap barrier between hydrogen gas which bubbles upwardly from cylinder 110 and any unreacted chlorine gas entering the upper portion of cathode chamber 130 from reaction column 188 or vacuum breaker tube 193. A vent hole 218 is formed in cylindrical side wall 23 on the chlorine gas side of upper baffle 216 to prevent dangerous accumulations of chlorine gas from forming therein. A lower baffle 220 extends fully across cathode chamber 130 generally parallel to and spaced apart from upper baffle 216. Lower baffle 220 extends from the floor 24 of cathode chamber 130 to an elevation substantially near the lowermost edge of upper baffle 216. In the preferred embodiment of the present invention, lower baffle 220 extends to a height approximately ⅛ inch below the lowermost edge of upper baffle 216, as it has been found that such a relationship between the upper and lower baffles helps to maintain the hydroxyl ion concentration proximate cathode 106 within the desired range of 1%–3%.

In order to help insure that metal hardness ions, such as calcium and magnesium do not form precipitates within the region of primary cathode 106 or ion permeable membrane 102, a third baffle 222 is provided. Baffle 222 extends substantially across cathode chamber 130 parallel to lower baffle 220 and spaced apart slightly therefrom. Baffle 222 extends to a height above catholyte level 132 and also extends downwardly to a point above floor 24 but substantially below the upper edge of lower baffle 220. Hydroxyl ions creates at the cathode are permitted to diffuse downwardly between lower baffle 220 and baffle 222 for dilution and removal from the cathode chamber. Simultaneously, any metal hardness ions tending to diffuse upwardly between lower baffle 220 and baffle 222 will encounter a significant hydroxyl ion concentration therein and will form precipitates, such as $Ca(OH)_2$ and $Mg(OH)_2$, before advancing beyond the upper edge of lower baffle 220. Such precipitates are continuously drained out from cathode chamber 130 through outflow tube 134. By precipitating metal hardness ions in this manner, hardness deposits upon the cathode chamber walls and associated plumbing are minimized.

By forming cathode chamber 130 and anode chamber 52 adjacent the floor 24 of chlorinator 20, the volume available for storage of salt above ceiling plate 58 is maximized. At the same time, however, access to cathode chamber 130, as might be required for periodic servicing, is made more difficult. In order to permit convenient access to cathode chamber 130 for such periodic maintenance, a cathode access pipe 224 extends within chlorinator 20 from a point just below removable cover 26 to a point just above floor 24, as shown in FIG. 13. Cathode access pipe 224 passes through a correspondingly sized bore formed within ceiling plate 58, which bore is surrounded by an annular ring 226 (see FIG. 11) that extends upwardly from ceiling plate 58. The upper end of cathode access pipe 224 is surrounded by a larger diameter pipe section 228 serving as a funnel to facilitate pouring of fluids into the upper end of pipe 224.

In order to remove any calcium or magnesium hardness deposits forming within cathode chamber 130, the user may periodically flush the catholyte with tape water to flush sodium hydroxide from cathode chamber 130. Preferably, the lower end of cathode access pipe 224 is disposed on the cathode side of upper baffle 216 to more easily flush sodium hydroxide from cathode chamber 130. After the aforementioned flushing operation, hydrochloric acid can be poured into cathode access pipe 224 for dissolving any hardness deposits. Tap water can then be added to cathode access pipe 224 for flushing all of the hydrochloric acid out of cathode chamber 130. During winter months, a brine solution can be poured into cathode access pipe 224 to lower the freezing point of the catholyte and thereby avoid damage which would otherwise result were the catholyte to freeze on cold winter nights.

As mentioned above, contaminants, such as calcium and magnesium, within anode chamber 52 can combine with hydroxyl ions that back-migrate from the catholyte into the anolyte to form chlorates that can reduce the concentration of the brine; such contaminates can also form deposits upon the anode side of the ion permeable membrane, which deposits can lead to a plugging of the membrane and a corresponding reduction in the efficiency of the chlorinator. Periodic dilution of the anolyte helps to avoid the formation of such chlorates and hardness deposits. Referring to FIG. 13, anode access pipe 230 extends upwardly from anode chamber 52, through ceiling plate 58 and terminates at an upper end 232 just below the floor of cup 176. In order to help support anode access pipe 230, ceiling plate 58 includes an annular ring 234 extending upwardly from the top face thereof for engaging the exterior wall of pipe 230. A further cylindrical pipe 236 surrounds the upper end 232 of anode access pipe 230 and extends upwardly through the floor of cup 176 to a point just below the upper edge 178 of cup 176. Float valve 154 (see FIG. 14) maintains the water level 152 within brine tank 150 approximately 1 inch below the upper end of cylinder 236, and approximately 2 inches below upper edge 178 of cup 176. The upper end of cylinder 236 is higher than the upper end of cylinder 184, and accordingly, pool water delivered to cup 176 overflows into the reaction column 188, and not into the upper open end of cylinder 236.

Periodically, the user will note that the level of salt within brine tank 150 has fallen. This condition can be detected simply by observing the height of salt level indicator rod 28. At such time, the user removes upper cover 26 and deposits solid salt into brine tank 150 until the salt level again reaches level 148. As the user deposits additional salt into brine tank 150, the water level within brine tank 150 rises above level 152. Because the lower end of anode access pipe 230 is open, the water level in access pipe 230 and surrounding cylinder 236 into rises until the anolyte overflows around the upper edge of cylinder 236 and spills into cup 176; in turn, the anolyte overflowing into cup 176 spills over the upper end of cylinder 184 and into reaction column 188 for delivery to cathode chamber 130. In the above-described manner, contaminants in the anolyte are periodically diluted each time salt is added to brine tank 150. Concentrations of such contaminants within the anolyte are thereby prevented from accumulating to harmful levels.

As described earlier, crossflow pipe 144 extends outwardly from cathode chamber 130, terminating in an external chlorinated water delivery port 50 which supplies chlorinated pool water overflowing from cathode chamber 130. In some installations, outlet port 50 may be directly connected to a gravity feed line back to the swimming pool for returning the chlorinated pool water thereto. However, in many installations, such a gravity feed line does not exist or cannot be easily added; in such instances, the chlorinated water is most easily returned to the swimming pool by coupling outlet port 50 to the suction side of the swimming pool pump. Referring to FIGS. 8, 9A, 9B, and 13, a feeder tank 240 is shown incorporating a novel float valve mechanism for metering chlorinated pool water to the suction side of the pool pump without risking a loss of prime which might result if air were admitted to the suction side of the pool pump. Feeder tank 240 includes a circular base 242 and an upwardly extending cylindrical side wall 244. A removable cover 246 encloses the upper end of feeder tank 240 A vent hole 248 is formed in side wall 244 immediately below cover 246. In addition, a bore 250 of a size commensurate with the outer diameter of crossflow pipe 144 is formed in the upper end of side wall 244 for permitting outlet port 50 to extend into the interior of feeder tank 240. A rubber retaining ring 260 is inserted over and around outlet port 50 for engaging the interior surface of cylindrical side wall 244 to releasably retain feeder tank 240 adjacent side wall 23 of chlorinator 20.

Figure 8:
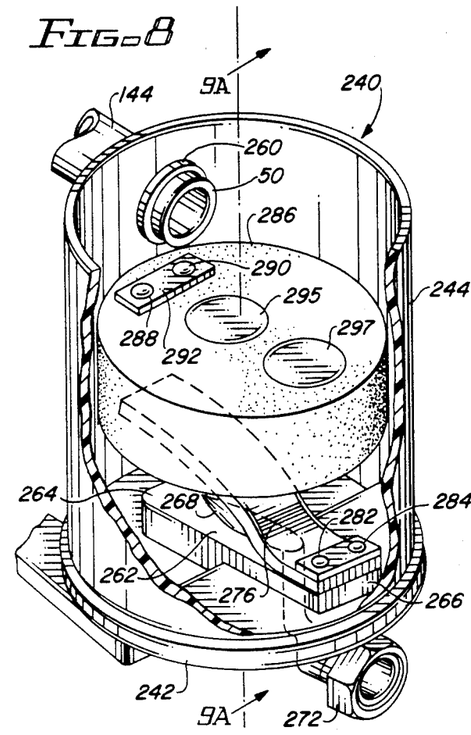
FIG. 8 is a cut-away perspective view of a feeder tank incorporating a novel float valve for regulating the outflow of chlorinated water produced by the chlorinator to the suction side of the pool pump.

As shown in FIG. 8, base 242 includes a substantially planar upwardly facing sealing surface 262 which extends from a first end 264 to an opposing second end 266. A flared opening 268 extends downwardly through sealing surface 262, beginning at a relatively narrow and shallow point near first end 264 and gradually widening and deepening to a second point near second end 266. Flared opening 268 communicates with a bore 270 extending downwardly through base 242. Bore 270 is in fluid communication with a busing 271 which has an internally threaded bore for threadedly engaging one end of an outlet connector 272; the second end of connector 272 is adapted to be coupled to one end of a water suction line 274, the opposite end of which is coupled to the suction side of the swimming pool pump.

Figure 9A:
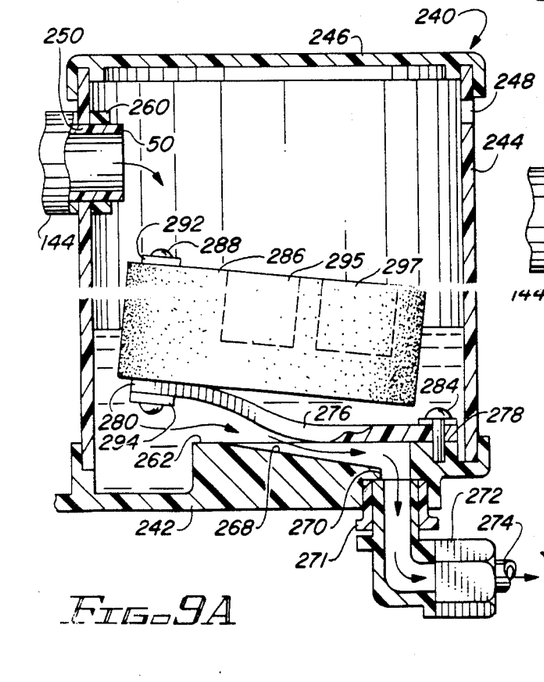
FIG. 9A is a cross-sectional view of the feeder tank and float valve shown in FIG. 8, taken through lines 9A as indicated in FIG. 8.
Figure 9B:
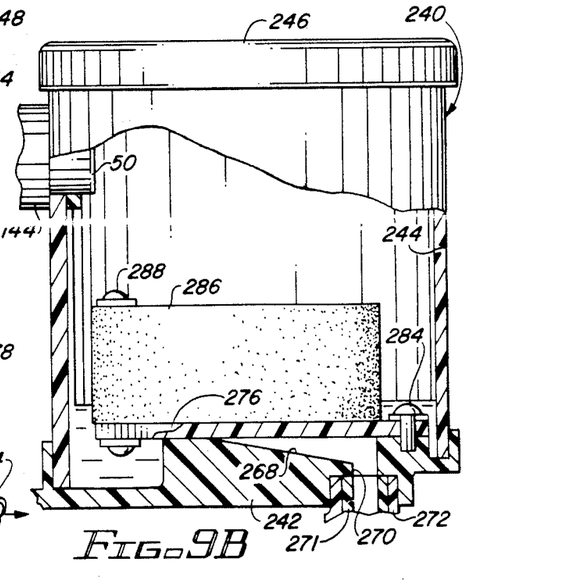
FIG. 9B is a cross-sectional view of the feeder tank similar to that shown in FIG. 9A but wherein the float valve is sealed.

Feeder tank 240 also includes a substantially planar, flexible elastomeric seal 276 which extends from first end 278 to opposing second end 280. Seal 276 is preferably made of 40 hardness durometer silicone rubber. As shown in FIGS. 9A and 9B, the length of flexible seal 276 is somewhat greater than the length of planar sealing surface 262. The first end 278 of seal 276 is secured to the second end of sealing surface 262 by a pair of pins 282 and 284 proximate the widest and deepest portion of flared opening 268. A circular float member 186, made of styrofoam or other buoyant material, is secured to the second end 280 of seal 176 by a pair of elongated pins 288 and 290. Reinforcing bars 292 and 294 are positioned above float 286 and below the second end of seal 280, and fasteners 288 and 290 extend through reinforcing bar 292, float 286, seal 276, and reinforcing bar 294. A pair of ceramic weights 295 and 297 are embedded in float 286 to dampen and stabilize the operation thereof.

Before the pool pump is switched on at the beginning of an operating cycle, feeder tank 240 initially contains only a small quantity of water, and accordingly, seal 276 rests upon sealing surface 262, sealing off flared opening 268, as shown in FIG. 9B. When the pool pump is initially switched on, air is prevented from entering into flared opening 268 because it is covered over its entire length by seal 276. The vacuum created by the pool pump within suction line 274 initially maintains seal 276 tightly against sealing surface 262. As pool water begins to circulate through the pump and into chlorinator 20, chlorinated pool water will be delivered into feeder tank 240 by outlet port 50. The water level within feeder tank 240 begins to rise, as shown in FIG. 9A, causing float 286 to rise. As float 286 rises, it lifts second end 280 of seal 276 above sealing surface 262, initially exposing only the narrow and shallow end of flared opening 268. Ordinarily, it would be difficult to overcome the large amount of suction created by the pool pump in order to remove seal 276 from opening 268. However, due to the leveraged forces applied by float 286 to seal 276, and in view of the gradual enlargement of flared opening 268, seal 276 is gradually pealed off of sealing surface 268 to overcome the suctional forces created by the pool pump for allowing pool water to flow into suction line 274. Moreover, flared opening 268 self regulates the operation of the feeder tank 240 by adjusting the outlet flow rate in accordance with the amount of chlorinated pool water within feeder tank 240. The higher float 286 rises, the greater the amount of flared opening 268 that is exposed, and hence the greater is the rate at which water may be withdrawn from feeder tank 240. Such a construction of the feeder tank valve permits the float 286 to rise until the inflow of chlorinated water into feeder tank 240 balances the outflow therefrom; moreover, the use of flared opening 268 allows the described valve structure to be used with pool pumps having a wide variation of suction.

Figure 1:
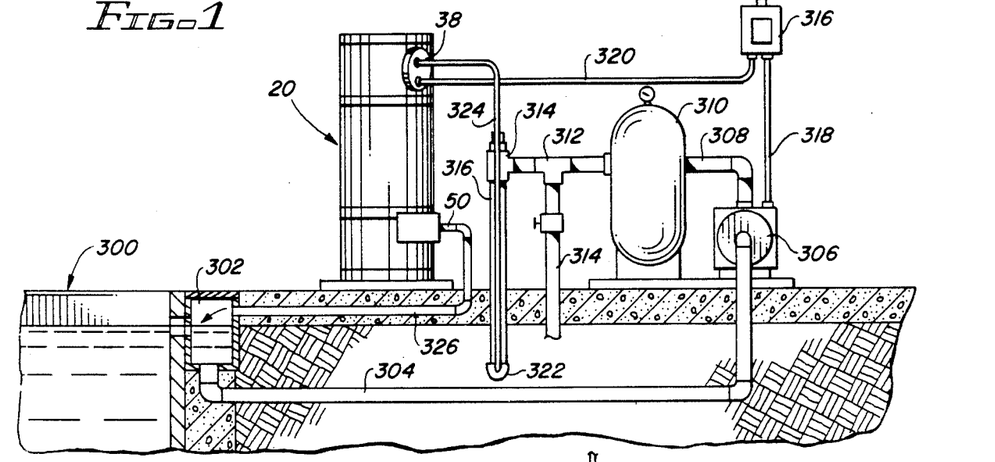
FIG. 1 illustrates an electrolytic pool chlorinator interconnected within the water circulation system of a swimming pool and wherein chlorinated water is returned by a gravity feed to the skimmer of the pool.

Within FIG. 1, chlorinator 20 is shown in a swimming pool installation permitting the return of chlorinated water by gravity feed to the skimmer of the swimming pool. Swimming pool 300 includes a skimmer 302 coupled to one end of suction line 304, the opposite end of which is coupled to the suction side of swimming pool pump 306. The outlet of pump 306 is coupled by pressure line 308 to the inlet of filter 310. The outlet of filter 310 is coupled to a tee connector 312, the central port of which is coupled to return line 314 which returns the filtered pool water to swimming pool 300. An electrical timer or control box 316 is coupled by electrical cabling 318 to the electric motor powering pool pump 306. Electrical cabling 320 also extends from electrical control box 316 to the power supply of chlorinator 20.

A third port of tee connector 312 is coupled to a further tee connector 314, one port of which is coupled to a downwardly extending pipe 316, the lower end of which extends below the level of the water within swimming pool 300 and is closed by a cap 322. Tube 324 extends vertically within tube 316 and extends through the upper port of tee connector 314 for coupling with pool water inlet port 38 of chlorinator 20 for supplying filtered pool water thereto. By extending tube 334 downwardly to the bottom end of outer tube 316, water within tube 324 will not be siphoned back into the pool when pump 306 is turned off, and the use of a check valve may thereby be avoided.

Outlet 50 of chlorinator 20 is connected by gravity feed line 326 to the upper portion of skimmer 302 for allowing chlorinated water overflowing from chlorinator 20 to flow back to swimming pool 300 under the force of gravity.

Figure 2:
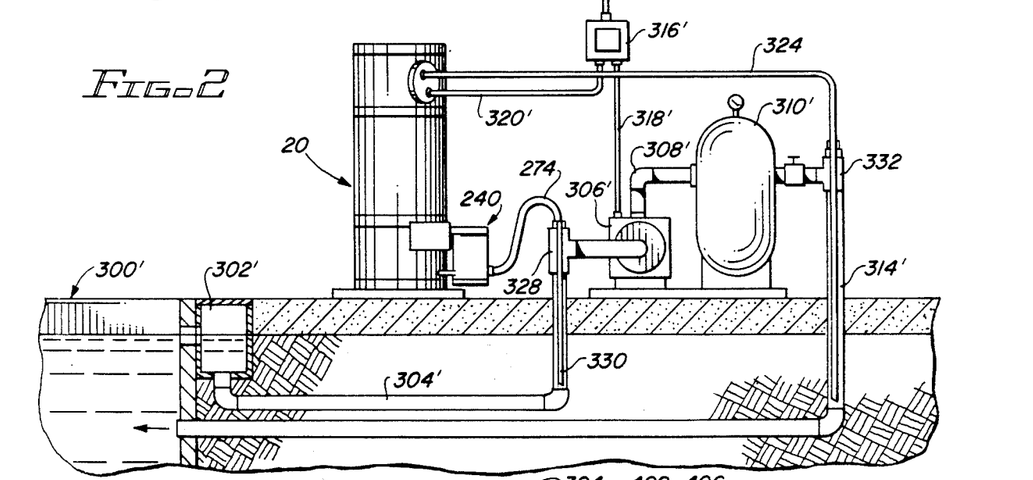
FIG. 2 illustrates an electrolytic pool chlorinator interconnected with the water circulation system of a swimming pool and wherein chlorinated water is returned to the suction side of the pool pump through a valved feeder tank.

FIG. 2 shows the manner in which chlorinator 20 is installed in conjunction with a swimming pool wherein it is not practical to use a gravity feed line in order to return chlorinated water to the swimming pool. Those components shown within FIG. 2 that correspond with those already described above in regard to FIG. 1 are labelled with correspondingly primed reference numerals. As in the installation described in FIG. 1, skimmer 302' is coupled by suction line 304' to the suction inlet of pool pump 306'. However, a tee connector 328 is installed above ground immediately ahead of the pool pump suction inlet. A flexible suction tube 274 extends from the outlet of feeder tank 240 to the upper port of tee connector 328 in fluid communication with a reduced diameter tube 330 which extends downwardly through tee connector 328 and into suction line 304' to a depth below the level of the water within swimming pool 300'. In this manner, no siphoning of water within feeder tank 240 will occur when pool pump 306' is turned off. When pump 306' is operating, chlorinated pool water is suctioned from feeder tank 240 through suction pipe 274 and through downwardly extending pipe 330 into the suction inlet of pump 306'.

The outlet of filter 310' is coupled by a return line 314' to swimming pool 300', as described in regard to FIG. 1 above. However, a tee connector 332 is interposed between filter 310' and return line 314', and water delivery tube 324' extends downwardly through tee connector 332 to a depth below the level of the water within swimming pool 300'. When pump 306' is operating, the positive pressure developed within return the 314' forces pool water upwardly through tube 324' for supplying pool water to chlorinator 20. By extending tube 324' downwardly within return line 314' to a depth below that of the water within swimming pool 300', siphoning of water out of delivery tube 324' after pump 306' is switched off is prevented, thereby avoiding the need for a check valve.

Figure 3:
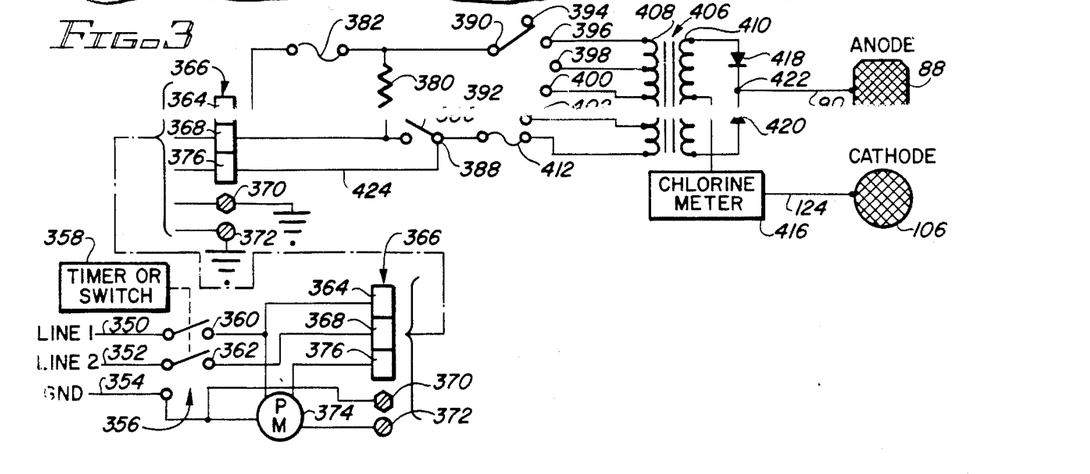
FIG. 3 is an electrical circuit schematic of the electrical power supply for the electrolytic pool chlorinator of the present invention and illustrating the manner by which the electric motor of the pool pump may be interconnected with the electrical power supply of the chlorinator to shut off the pool pump motor when the pool pump loses its prime for an extended period.

It may be recalled that one of the features of the present invention is to provide a safety shut-off feature for shutting off electrical power to the pool pump motor when pool water fails to circulate through the pool pump for an extended period of time despite the application of electrical power thereto. Within the preferred embodiment of the present invention, the pool pump motor is interconnected with the electrical power supply of electrolytic pool chlorinator 20 in a manner best understood with reference to FIG. 3. As shown in FIG. 3, a 240 volt alternating current voltage is supplied by conductors 350, 352 and 354, conductors 350 and 352 representing the "hot" lines, while conductor 354 represents a ground connection. A ganged switch 356, which may be operated manually or by an electrical timer 358, simultaneously connects or disconnects hot lines 350 and 352 to terminals 360 and 362, respectively. Conductor 350 is coupled to a first terminal 364 of a field wiring block 366 disposed within power supply housing 34 of chlorinator 20. Conductor 362 is coupled to a second wiring terminal 368 of field wiring block 366. Ground conductor 354 is electrically connected with ground screw 370, visible upon the front face 36 of power supply housing 34 (see FIG. 4). Chlorinator 20 is also provided with a chassis ground connection screw 372 adapted to be coupled to a wire in physical contact with the earth.

As shown in FIG. 3, pool pump motor 374 is coupled to ground line 354 and includes a first A.C. voltage terminal coupled to terminal 360 for receiving an alternating current voltage therefrom. The second hot terminal of pool pump motor 374 is coupled to terminal 376 of field wiring block 366, rather than being directly coupled to terminal 362, as is the usual case.

Within electrical power supply housing 34 of chlorinator 20 is a resistive heater 380 which, in the preferred embodiment, is a 3K ohm 25 watt heating element, coupled in series with a time-delayed slow-blow fuse 382 between field wiring block terminals 364 and 368. Fuse 382 is rated at 1½ amps at 250 volts. Referring to FIG. 62, resistive heater 380 is secured to a metal bar 384 which is in thermal contact with metal conduit 46 through which pool water is ordinarily circulated. Resistive heater 380 generates heat which is absorbed by metal bar 384 and which is ordinarily dissipated into the pool water flowing through metal conduit 46.

As shown in FIG. 3, a thermostatic switch 386 is coupled between field wiring block terminal 368 and electrical terminal 388. Thermostatic switch 386 may be of the type commercially available from Therm-O-Disc, a division of Emerson Electric of Mansfield, Ohio. Referring to FIG. 6, thermostatic switch 386 is also coupled to metal bar 384 in thermal contact therewith. Thermostatic which 386 is designed to normally remain closed when the temperature thereof is below a predetermined safe temperature. If pool water stops flowing through metal conduit 46 while electrical power continues to be supplied to field wiring block 366, then after approximately five minutes, the temperature of metal bar 384 and thermostatic switch 386 rises above the aforementioned predetermined temperature, and themostatic switch 386 opens. Applicant's prior U.S. Pat. No. 4,599,159 discloses a similar arrangement of a thermostatic switch and resistive heater.

Figure 5:
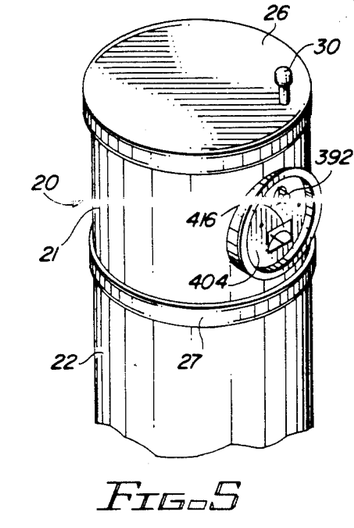
FIG. 5 is a perspective view of the upper portion of the chlorinator housing shown in FIG. 4 as viewed from the opposing side of the chlorinator.

Still referring to FIG. 3, the junction of resistive heater 380 and fuse 382 is coupled to the central contact 390 of a rotary switch 392 having an inactive contact 394 for allowing the chlorinator to be turned off manually. Rotary switch 392 also includes peripheral contacts 396, 398, 400, and 402, which permit the rate at which chlorine is produced by electrolytic chlorinator 20 to be varied, as explained below. Rotary switch 392 is visible in FIGS. 5 and 6 upon the rear panel 404 of chlorinator 20.

As shown in FIG. 3, the chlorinator power supply includes a transformer 406 having a primary coil 408 with a number of input tap points along the length thereof. Each of the plurality of input tap points is coupled to one of the peripheral contacts 396–402 of rotary switch 392, whereby the number of coil turns supplied with the 240 volt alternating current source voltage can be varied, thereby varying the output alternating current voltage produced across secondary coil 410. The opposing end of primary coil 408 is coupled through a time-delayed, slow-blow fuse 412 back to electrical terminal 388, in order to complete the flow of current through thermostatic switch 386. Fuse 412 is rated at 1½ amps at 250 volts.

As shown in FIG. 3, secondary coil 410 of transformer 406 includes a center tap 414 coupled through electrical meter 416 to conductor 124 for applying a negative DC potential to primary cathode 106 (and optionally to auxiliary cathode 114). The ends of secondary coil 410 are coupled by rectifying diodes 418 and 420 which are joined at node 422. Conductor 90 couples node 422 to anode 88 for applying a positive direct current potential thereto. Electric meter 416, which is visible upon rear panel 404 within FIGS. 5 and 6, indicates the averaged DC current flowing between anode 88 and cathode 106, thereby providing an indication of the rate at which chlorine gas is being produced by chlorinator 20. In the preferred embodiment of the present invention, the chlorinator is operated in the voltage range of 3-6 Volts D.C., and in the current range of 4-30 Amps.

Referring again to FIG. 3, electrical terminal 388 is coupled by conductor 424 to terminal 376 of field wiring block 366. Accordingly, when thermostatic switch 386 is in its usual closed position, the alternating current voltage sourced by conductor 352 is coupled through terminal 368, through thermostatic switch 386, and through terminal 376 to the second hot input terminal of pool pump motor 374, thereby providing 240 Volt A.C electrical power thereto. However, if thermostatic switch 386 opens, as when pool water has stopped flowing through metal conduit 46 of chlorinator 20 for more than five minutes, then the alternating current voltage sourced by conductor 352 is no longer applied to pool pump motor 374, thereby avoiding damage to the pool pump motor which might otherwise result when the pool pump loses its prime or is otherwise deprived of pool water at its suction inlet.

It should now be appreciated by those skilled in the art that an electrolytic pool chlorinator for chlorinating a swimming pool or the like has been described which provides many unique advantages in comparison with known electrolytic chlorinators and which fully meets all of the above-stated objects of the present invention. While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. An electrolytic pool chlorinator comprising in combination:

a. an anode chamber for containing a quantity of salt and water to form a brine solution;
   b. an anode disposed within said anode chamber;
   c. a cathode chamber for containing a catholyte;
   d. an ion permeable selective membrane dividing said cathode chamber from said anode chamber and allowing sodium ions to pass through said membrane from said anode chamber to said cathode chamber while substantially preventing hydroxyl ions within said cathode chamber from passing through said membrane to said anode chamber;
   e. a primary cathode disposed within said cathode chamber substantially adjacent to said membrane;
   f. an electrical power supply coupled to said anode and to said primary cathode for imposing a direct a current electrical potential thereacross and for liberating chlorine gas at said anode and hydrogen gas at said primary cathode;
   g. catholyte dilution means in fluid communication with said cathode chamber for diluting the catholyte within said cathode chamber in order to prevent an excessive concentration of hydroxyl ions within said cathode chamber; and
   i. baffle means disposed within said cathode chamber between said primary cathode and said catholyte dilution means, said baffle means permitting hydroxyl ions to slowly diffuse from a region proximate said primary cathode toward said catholyte dilution means in order to maintain a concentration of hydroxyl ions in the catholyte surrounding said primary cathode for prompt start-up and good current efficiency while preventing the overall hydroxyl ion concentration within the catholyte from becoming high enough to cause excessive back-migration of hydroxyl ions from the catholyte to said anode chamber.

2. An electrolytic pool chlorinator as recited by claim 1 wherein said cathode chamber has predetermined cross-sectional dimensions in the vicinity of said baffle means, and wherein said baffle means has dimensions substantially corresponding to the predetermined cross-sectional dimensions of said cathode chamber in the vicinity of said baffle means said baffle means having a plurality of openings to regulate the diffusion of hydroxyl ions with the catholyte between said primary cathode and said catholyte dilution means.

3. An electrolytic pool chlorinator as recited by claim 1 wherein said baffle means comprises a second cathode spaced apart from and electrically coupled to said primary cathode for attracting any positively-charged metal hardness ions introduced into the catholyte by said catholyte dilution means before said metal hardness ions reach said primary cathode.

4. An electrolytic pool chlorinator for chlorinating a pool of water, said electrolytic pool chlorinator comprising in combination:

a. an anode chamber for containing a quantity of salt and water to form a brine solution;
   b. an anode disposed within said anode chamber;
   c. a cathode chamber for containing a catholyte, said cathode chamber including a floor and side walls extending between first and second opposing ends of said cathode chamber;
   d. an ion permeable selective membrane dividing said anode chamber from the first end of said cathode chamber and allowing sodium ions to pass through said membrane from said anode chamber to said cathode chamber while substantially preventing hydroxyl ions within said cathode chamber from passing through said membrane to said anode chamber;

e. a cathode disposed within said cathode chamber proximate the first end thereof and substantially adjacent to said membrane;

f. an electrical power supply coupled to said anode and to said cathode for imposing a direct current electrical potential thereacross and for liberating chlorine gas at said anode and hydrogen gas at said cathode;

g. catholyte dilution means communicating with said cathode chamber at the second end thereof, said catholyte dilution means diluting the concentration of hydroxyl ions within said catholyte and maintaining the level of said catholyte within said cathode chamber at a predetermined catholyte level;

h. an upper baffle disposed within said cathode chamber and extending substantially between opposing side walls thereof, said upper baffle being disposed between the first and second opposing ends of said cathode chamber and extending downwardly into said catholyte to a predetermined depth;

c. a lower baffle disposed within said cathode chamber and extending substantially between the opposing side walls thereof and generally parallel to and spaced apart from said upper baffle, said lower baffle extending upwardly from the floor of said cathode chamber into the catholyte to a height substantially near said predetermined depth in order to control the migration of hydroxyl ions from the first end of said cathode chamber to the second end of said cathode chamber.

5. An electrolytic pool chlorinator as recited by claim 4 wherein said lower baffle is disposed within said cathode chamber between said upper baffle and the second end of said cathode chamber.

6. An electrolytic pool chlorinator as recited by claim 4 further including an additional baffle extending substantially parallel to said lower baffle within said cathode chamber and extending substantially across the side walls of said cathode chamber proximate said lower baffle, said additional baffle extending upwardly to a point above said predetermined catholyte level and extending downwardly to a point above the floor of said cathode chamber, said additional baffle forming a region of said catholyte between said additional baffle and said lower baffle in which metal hardness ions within the catholyte can precipitate prior to reaching said cathode.

7. An electrolytic pool chlorinator as recited by claim 4 wherein said catholyte dilution means includes a source of pool water disposed in the second end of said cathode chamber for adding fluid to said catholyte, said catholyte dilution means including an outflow pipe disposed within said cathode chamber and having an inlet located near the floor of said cathode chamber for draining excess catholyte from said cathode chamber.

8. An electrolytic pool chlorinator as recited by claim 4 wherein said outflow pipe has an open upper end located at said predetermined catholyte level for permitting catholyte within said cathode chamber to overflow from said open upper end to a point external from said cathode chamber.

9. An electrolytic pool chlorinator as recited by claim 4 wherein said source of pool water includes means for metering the pool water to the catholyte for maintaining a substantially constant inflow of pool water to the catholyte in order to maintain the hydroxyl ion concentration of the catholyte in the vicinity of said cathode at a substantially constant value.

10. An electrolytic pool chlorinator for chlorinating a pool of water, said pool of water including a filter and a pump for circulating pool water between the pool and the filter, said electrolytic pool chlorinator comprising in combination:

a. an anode chamber for containing a quantity of salt and water to form a brine solution;

b. an anode disposed within said anode chamber;

c. a cathode chamber for containing a catholyte including sodium hydroxide;

d. a cathode disposed within said cathode chamber;

e. an ion permeable selective membrane dividing said cathode chamber from said anode chamber and allowing sodium ion to pass through said membrane from said anode chamber to said cathode chamber while substantially preventing hydroxyl ions within said cathode chamber from passing through said membrane to said anode chamber;

f. an electrical power supply coupled to said anode and to said cathode for imposing a direct current electrical potential thereacross and for liberating chlorine gas at said anode and hydrogen gas at said cathode;

g. collection means for collecting chlorine gas liberated in said anode chamber;

h. inlet means in fluid communication with an outlet side of the pump for receiving a stream of pool water under pressure;

i. reaction means coupled to said collection means for receiving liberated chlorine gas and coupled to said inlet means for receiving said stream of pool water, said reaction means intermixing said chlorine gas and pool water to form hypochlorous acid and hydrochloric acid;

j. catholyte dilution means coupled to said reaction means for receiving pool water containing hypochlorous acid and hydrochloric water therefrom, said catholyte dilution means introducing the pool water containing hypochlorous acid and hydrochloric acid into said cathode chamber for diluting the catholyte therein and lowering the hydroxyl ion concentration thereof, said catholyte dilution means including an overflow outlet for draining excess catholyte from said cathode chamber; and k. return means for returning said drained excess catholyte back to said pool of water along with said hypochlorous acid.

11. An electrolytic pool chlorinator as recited by claim 10 wherein said reaction means includes a reaction column having a large surface area over which pool water flows for reacting with said chlorine gas.

12. An electrolytic pool chlorinator as recited by claim 10 wherein said catholyte dilution means is disposed within said cathode chamber at a point remote from said cathode to minimize the likelihood of metal hardness ions within the pool water from precipitating upon said cathode.

13. An electrolytic pool chlorinator for chlorinating a pool of water, said pool of water including a filter and a pump for circulating pool water between the pool and the filter, the pump including a suction inlet, said electrolytic pool chlorinator comprising in combination:

a. an anode chamber for containing a quantity of salt and water to form a brine solution;

b. an anode disposed within said anode chamber;

c. a cathode chamber for containing a catholyte including sodium hydroxide;

d. a cathode disposed within said cathode chamber;

e. an ion permeable selective membrane dividing said cathode chamber from said anode chamber and allowing sodium ions to pass through said membrane from said anode chamber to said cathode chamber while substantially preventing hydroxyl ions within said cathode chamber from passing through said membrane to said anode chamber;

f. an electrical power supply coupled to said anode and to said cathode for imposing a direct current electrical potential thereacross and for liberating chlorine gas at said anode and hydrogen gas at said cathode;

g. collection means for collecting chlorine gas liberated in said anode chamber;

h. mixing means having a water inlet for receiving a supply of water and having a chlorine gas inlet coupled to said collection means for receiving chlorine gas, said mixing means intermixing the chlorine gas with the received water for providing a chlorinated stream of water; and i. a feeder tank coupled to said mixing means for receiving the stream of chlorinated water, said feeder tank further including:

i. a base including a substantially planar, upwardly directed sealing surface, said sealing surface extending between first and second opposing ends, said sealing surface having a flared opening extending therethrough downwardly into said base, said flared opening being relatively narrow and shallow adjacent the first end of said sealing surface and gradually extending wider and deeper toward the second end of said sealing surface, said base having a bore formed therein in fluid communication with said flared opening;

ii. side walls extending upwardly around said base to form a tank for containing said chlorinated water;

iii. an outlet extending from said base, said outlet being in fluid communication with the bore formed in said base;

iv. means for coupling said outlet of said base to the suction inlet of the pump for feeding chlorinated water to the pump in order to introduce the chlorinated water into the pool of water;

v. a flexible, elastomeric planar seal extending between first and second opposing ends and being generally disposed over said sealing surface;

vi. fastening means for securing the first end of the seal to the second end of the sealing surface adjacent the wider and deeper end of said flared opening; and vii. a float secured to the second end of said seal proximate the narrower and shallower portion of said flared opening, said float causing the second end of said seal to initially lift off of the narrower and shallower end of said flared opening as said feeder tank begins to fill with chlorinated water, said float subsequently uncovering the entire length of said flared opening when said feeder tank is filled with chlorinated water, whereby the feeder tank permits chlorinated water to be withdrawn at a faster rate when the feeder tank is filled with chlorinated water while gradually decreasing the rate of outflow as the level of chlorinated water within said feeder tank falls.

14. An electrolytic pool chlorinator as recited by claim 13 wherein said feeder tank inlet is formed within a side wall thereof.

15. An electrolytic pool chlorinator as recited by claim 13 wherein said float includes a weight for damping the operation of said float.

16. An electrolytic pool chlorinator for chlorinating a pool of water, said electrolytic pool chlorinator comprising in combination:

a. an outer housing including a floor, vertical side walls, and a removable upper cover;

b. an anode chamber supported upon the floor of said outer housing for containing a quantity of brine solution;

c. an anode disposed within said anode chamber;

e. a cathode chamber disposed proximate to said floor of said outer housing for containing a catholyte including sodium hydroxide;

f. said cathode chamber including a ceiling for enclosing said cathode chamber and for supporting salt used to form the brine solution;

g. a cathode disposed within said cathode chamber;

h. an ion permeable selective membrane dividing said cathode chamber from said anode chamber and allowing sodium ions to pass through said membrane from said anode chamber to said cathode chamber while substantially preventing hydroxyl ions within said cathode chamber from passing through said membrane to said anode chamber;

i. an electrical power supply coupled to said anode and to said cathode for imposing a direct current electrical potential thereacross and for liberating chlorine gas at said anode and hydrogen gas at said cathode;

j. gas collections means for collecting chlorine gas liberated in said anode chamber;

k. said gas collection means including an upper cover over said anode chamber and adapted to support salt deposited within said housing to form the brine solution; and l. a cathode access pipe having an upper end extending to a point just below the upper cover of said outer housing and having a lower end extending through the ceiling of said cathode chamber, said cathode access pipe allowing an operator to pour water, hydrochloric acid, or brine into said cathode chamber for periodic servicing without requiring disassembly of said cathode chamber.

17. An electrolytic pool chlorinator for chlorinating a pool of water, said pool of water including a filter and a pump for circulating pool water between the pool and the filter, said pump having an electrical pump motor associated therewith, the electrolytic pool chlorinator comprising in combination:

a. an electrolytic cell including an anode chamber having an anode therein, a cathode chamber having a cathode therein, and an ion permeable selective membrane for dividing the anode and cathode chambers from one another;

b. an electrical power supply coupled to said anode and to said cathode for imposing a direct current electrical potential thereacross and for liberating chlorine gas at said anode and hydrogen gas at said cathode;

c. inlet means in fluid communication with the pump for receiving a stream of pool water from the pool;

d. intermixing means for intermixing chlorine gas liberated at the said anode with pool water received by said inlet means;
e. a metal conduit interposed between said inlet means and said intermixing means, the pool water received by said inlet means passing through said metal conduit;
f. a heat source in thermal contact with said metal conduit;
g. a thermostatic switch in thermal contact with said metal conduit, said thermostatic switch having a closed position connecting alternating current electrical power to said electrical power supply when the temperature of said metal conduit is below a predetermined temperature, said thermostatic switch having an opened position disconnecting alternating current electrical power from said electrical power supply when the temperature of said metal conduit is above said predetermined temperature, said thermostatic switch being operative to detect a decrease in the flow of pool water through said metal conduit in the form of a rise in the temperature thereof and being responsive thereto by turning off said electrical power supply to prevent the further generation of chlorine gas within said electrical pool chlorinator;
h. said electrical power supply of said electrolytic pool chlorinator having at least one ground terminal for connection to ground potential and having at least one A.C. voltage input terminal adapted to receive an alternating current voltage, said electrical power supply further including an output terminal for selectively supplying said alternating current voltage, said output terminal being electrically coupled by said thermostatic switch to said A.C. input terminal when said thermostatic switch is in its closed positon; and
i. wiring means for electrically coupling said electrical pump motor to said output terminal for shutting off the supply of electrical power to said electrical pump motor when said thermostatic switch is in its opened position, thereby avoiding damage which might otherwise result to the pump and the electrical pump motor due to loss of prime of the pump.

18. An electrolytic pool chlorinator comprising in combination:
a. an anode chamber for containing a brine solution;
b. an anode disposed within said anode chamber;
c. a cathode chamber for containing a catholyte;
d. an ion-permeable selective membrane dividing said cathode chamber from said anode chamber and allowing sodium ions to pass through said membrane from said anode chamber to said cathode chamber while substantially preventing hydroxyl ions within said cathode chamber from passing through said membrane to said anode chamber;
e. a cathode disposed within said cathode chamber proximate to said membrane;
f. an electrical power supply coupled to said anode and to said cathode for imposing a direct current electrical potential thereacross and for liberating chlorine gas at said anode and hydrogen gas at said cathode;
g. a brine tank containing a quantity of water and salt to form a brine solution, said brine tank being in fluid communication with said anode chamber for supplying the brine solution thereto;
h. means for supplying water to brine tank as water and salt are consumed therefrom, said means maintaining the level of fluid within said brine tank at a first predetermined height;
i. an access pipe having a lower end in fluid communication with said anode chamber and extending to an opposing upper end, the opposing upper end including an overflow opening at a second predetermined height above said first predetermined height; and
j. a flow path conduit having an upper end in fluid communication with the overflow opening of said access pipe and having a lower end in fluid communication with said cathode chamber, the addition of salt to said brine tank causing the brine solution within said anode chamber to rise upwardly through said access pipe above said first predetermined height and to overflow through the overflow opening of said access pipe through said flow path conduit into said cathode chamber, thereby removing contaminants from the anode chamber as salt is added to said brine tank.

19. An electrolytic pool chlorinator as recited by claim 18 wherein said means for adding water to said brine tank includes a float controlled valve which permits water to be admitted into said brine tank until the level of fluid within said brine tank reaches said first predetermined height.

20. An electrolytic pool chlorinator as recited by claim 18 wherein said flow path conduit comprises a reaction column for mixing chlorine gas with pool water and delivering chlorinated pool water to said cathode chamber.

* * * * *